United States Patent

Dahlstrom et al.

[11] 4,309,254
[45] Jan. 5, 1982

[54] ALCOHOL RECOVERY PROCESS

[75] Inventors: Rodney A. Dahlstrom, Mansfield; Jacob N. Rubin, Newton Highlands, both of Mass.

[73] Assignee: Stone and Webster Eng. Corp., Mass.

[21] Appl. No.: 141,256

[22] Filed: Apr. 17, 1980

[51] Int. Cl.³ .......................... B01D 1/26; C07C 29/80
[52] U.S. Cl. ........................... 203/47; 203/19; 203/25; 203/76; 203/77; 203/79; 203/100; 203/DIG. 13; 203/DIG. 16; 159/47 R; 426/18; 426/494; 426/624; 435/161; 202/174; 202/176
[58] Field of Search ...................... 203/19, 39, 47, 100, 203/74–80, 98, 97, 96, DIG. 13, DIG. 16, DIG. 8, 27, 26; 159/17 P, 47 R; 426/492–495, 624, 31, 18, 468, 456, 465, 469, 472, 478, 173; 202/174, 154, 234, 155, 176, 172; 435/161

[56] References Cited

U.S. PATENT DOCUMENTS

| 963,275 | 1/1910 | Chute | 435/161 |
|---|---|---|---|
| 1,702,495 | 2/1929 | Clapp | 203/19 |
| 2,127,138 | 8/1938 | Reich | 203/27 |
| 2,148,579 | 2/1939 | Reich | 203/27 |
| 2,292,769 | 8/1942 | Patee | 426/495 |
| 2,345,238 | 3/1944 | Christensen | 426/465 |
| 3,763,020 | 10/1973 | Drew et al. | 203/47 |

Primary Examiner—Wilbur L. Bascomb, Jr.

[57] ABSTRACT

A process for the production of alcohol from a fermented feed wherein insoluble organic matter is separated prior to entry into a first distillation column. The insoluble organic matter is dried under pressure to produce dried distillers grain and wherein excess vapor is removed from the drying zone to provide heat to the distillation system. The present process also includes removing excess water vapor from the evaporation zone, obtained from supplemental heating supplied by the overhead from said first distillation column, compressing said water vapor, and recycling it to the distillation columns and the evaporation zone.

11 Claims, 1 Drawing Figure

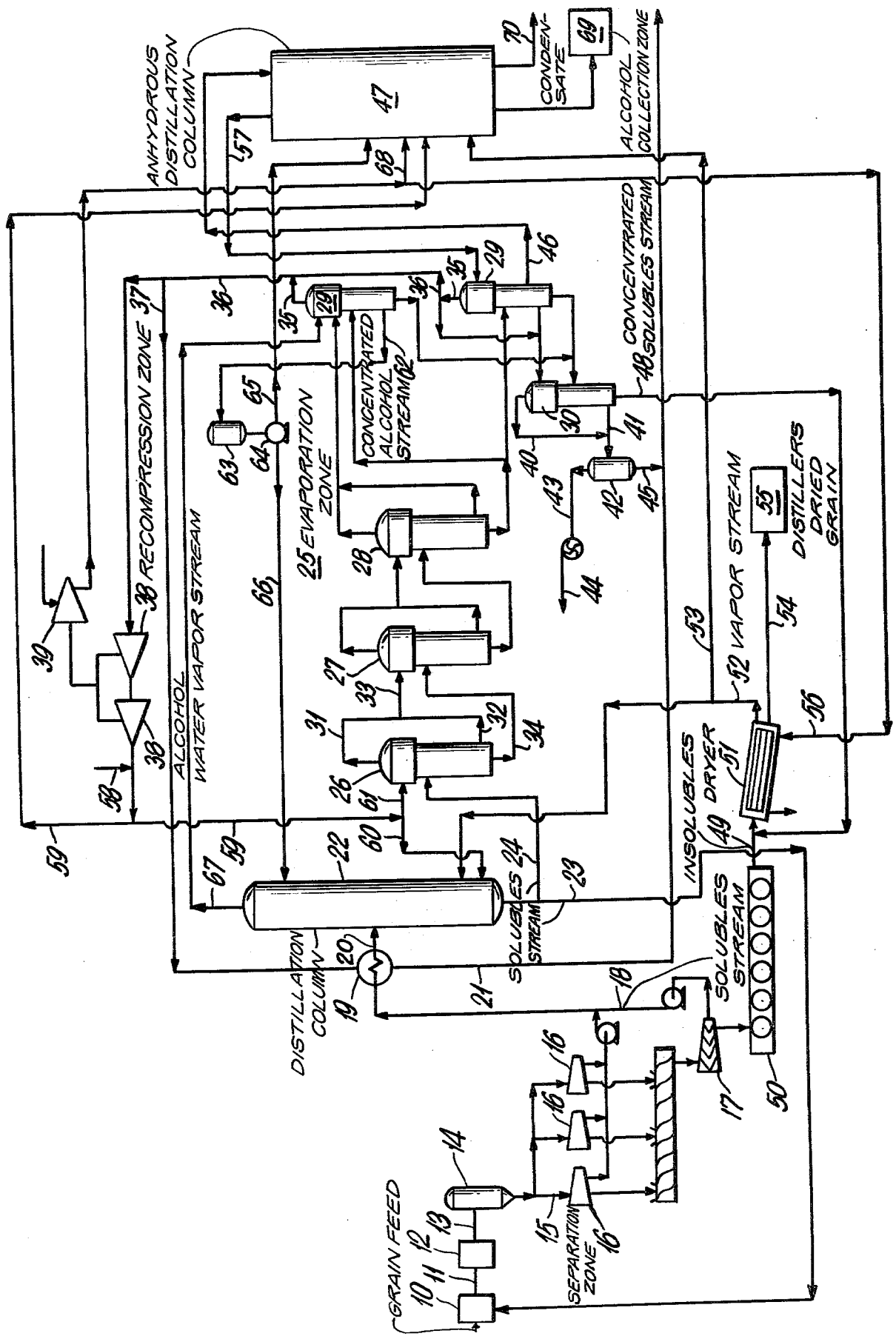

ALCOHOL RECOVERY PROCESS

BACKGROUND OF THE INVENTION

It is well-known that alcohol can be recovered by subjecting a fermented mash to a series of distillation steps. The resulting alcohol has heretofore been predominately used for the production of alcoholic beverages.

Recently, however, the so-called "energy crisis" has created significant interest in the conversion of biomass to fuel grade alcohol which can be blended with no-lead gasoline to produce "Gasohol" fuel. Fuel grade alcohol may be produced from any material containing cellulose, starch or sugar. For example, the United States has an abundant supply of corn and wheat which are considered primary feedstocks.

In conventional processing the grain feedstock is milled and then diluted with both a recycle and fresh process water. This mixture is then heated or "cooked" by direct steam injection to 212°-300° F. to initiate liquifaction and to sterilize the mixture. Enzymes are added to the solution both before and after cooking to further break down the complex starch molecules and to convert starch to sugar.

Subsequently, the solution is cooled to about 85°-90° F. and fed to a fermentation zone. Yeast is added and the sugar is converted to alcohol and carbon dioxide. From this batch-wise fermentation process an alcohol concentration of between about 7 and 15% is achieved. 95 volume percent alcohol is recovered by conventional distillation and absolute alcohol (greater than 99.5%) can be obtained by azeotropic distillation.

A dilute aqueous solution containing soluble and insoluble organic matter, fibers, and ash from the grains is obtained from the fermentation zone. This solid slurry is processed through an evaporation and drying zone.

Evaporation is accomplished in a multi-effect unit having at least two regions operating at successively lower pressures and temperatures. Typically, the highest pressure region (the first region) operates at a pressure of between about 15 and 45 psia and the last and lowest pressure region exhibits a pressure between about 1.0 and 20 psia. Overhead vapor from the first region is supplied to the second region, etc. Vapor from the last region may either be condensed or compressed for recycling to the first region.

The last process step involves drying to produce dried distillers grain which is valuable animal feed. Conventional practice utilizes indirect steam at a pressure of 100 to 250 psia or hot flue gas to provide heat for drying. The vapors produced in the dryer are typically vented into the atmosphere. The dryers are typically operated by using a "sweep air" to carry the water vapor from the drying grains.

SUMMARY OF THE INVENTION

The broad purpose of the present invention is to provide a novel method of reducing the external energy required to operate the various steps involved in the production of fuel grade alcohol by utilizing the excess energy of one step to assist in the operation of another step. There is also provided a solids separation step whereby insolubles remaining after fermentation of the grain feed are removed prior to entry into the first distillation column.

More specifically, a fermented mesh containing 7-15 volume percent alcohol is fed to a grain separation zone. This dilute aqueous slurry containing soluble and insoluble fibers, proteins, fats, unconverted starch and sugars, and ash is centrifuged and pressed. A first portion, containing major fractions of the soluble constituents, alcohol and water, is fed to a first distillation column or beer still. A second portion containing a majority of the insoluble organic matter and a small amount of alcohol and water is fed to a pressurized drying zone to recover the insoluble fraction as Distillers Dried Grains. The alcohol recovered from the drying zone is recycled to the first distillation column.

The removal of the fibrous materials prior to distillation improves the operability of the first distillation column by reducing the frequency of shutdowns to defoul the column.

After distillation a portion of the spent mesh is sent back to the cooking zone to provide heat and process water for cooking and fermentation. The remainder of the spent mash is sent to a multieffect evaporation zone. The evaporation zone contains at least two regions operating under successively lower temperature and pressure conditions. The bottom and overhead vapor from the highest pressure region are fed to the next region in the series.

The liquid slurry in one of the lower pressure regions is vaporized by the overhead from the distillation column in addition to conventional evaporative heating. The temperature and pressure of this pressure region must be less than the temperature and pressure of the upper region of the first distillation column. Excess vapor generated by this supplemental evaporative heat source is withdrawn and sent to a recompression zone where it is compressed by a back pressure steam turbine or other power source.

The water compressed in the recompression zone is used to provide reboil steam for the distillation columns as well as steam for the highest pressure region of the evaporation zone. Alternatively, the compressed water vapor from the evaporation zone may be used to heat other process streams.

The second portion of the dilute aqueous slurry obtained from the grain separation zone is fed to a drying zone. The drying zone is operated under pressure and may utilize steam as the heat source. By operating the drying zone under pressure, the vapor recovered therein can be used as live steam or reboil steam for the columns in the distillation section.

The use of such a drying zone provides a two-fold advantage over conventional processes. A 25% savings in steam consumption can be realized since a substantial amount of the recycled vapor is not vented into the atmosphere. Secondly, it recovers the portion of alcohol entrained with the aqueous slurry allowing the removal of fibrous solids prior to the beer still, thus improving the operability of the beer still.

BRIEF DESCRIPTION OF THE PREFERRED EMBODIMENT

The present process is more particularly described with reference to the following detailed description accompanying the drawing, wherein:

The FIGURE is a schematic flow diagram illustrating one embodiment of the invention.

Referring to the FIGURE the grain feed is supplied to cooker 10 and steam heated to a temperature of between about 212° and 300° F. The resulting solution is fed through line 11 to fermenter 12 where yeast is added to facilitate the conversion of sugar to alcohol and carbon dioxide. A dilute alcohol solution having a concentration of 7–15 vol % and containing soluble and insoluble organic matter, fibers and ash is obtained therefrom and sent via line 13 to collection area 14.

The solution proceeds to separation zone 15 where it is mechanically separated by centrifuge 16 and press 17. A first portion of the solid slurry containing major fractions of the soluble constituents, alcohol and water enters line 18 to combine with a similar stream from centrifuge 16. The combined stream is heated at 19 to a temperature of at least 90° F. before entering distillation column 22 via line 20.

The lower region of the distillation column or beer still operates at a temperature of between about 212° F. and 300° F., preferably in the range of 245° to 260° F. The pressure in this region is between about 15 and 60 psia, preferably 25–35 psia. Separation of the insoluble organic matter prior to entry into the distillation column effectively reduces the incidence of fouling, thereby providing smoother operation.

A heated aqueous solution containing primarily soluble organic matter is obtained as a bottom from distillation column 22. A portion of this solution is returned to cooker 10 via line 23 to provide heat for the cooking and fermentation operations. Most of the solution is sent through line 24 to the multi-effect evaporator 25.

The evaporator contains at least two regions operating under successively lower pressure regions. As shown in the FIGURE five pressure regions 26–30 are employed. Highest pressure region 26 operating under a temperature of between about 212° F. and 275° F. and a pressure of between about 15 and 45 psia receives the solution coming in from line 24. An overhead of water vapor proceeds via line 31 to combine with condensate from line 32 for entry into pressure region 27 via line 33. A bottom containing solid matter and a small quantity of water is obtained from highest pressure region 26 and proceeds through line 34 to pressure region 27. The same procedure is repeated for each successive pressure region.

Pressure regions 27–30 operate under various temperature and pressure conditions, limited in only two ways. First, each successive pressure region must operate under a lower temperature and pressure than the preceeding region. Second, the pressure region receiving the overhead from distillation column 22 as hereinafter described must operate under a lower temperature and pressure than said upper region of said distillation column. Typically, the lowest pressure region operates under a temperature of between about 100° and 230° F. and a pressure of between about 1.0 and 20 psia.

As shown in the FIGURE fourth pressure region 29 receives excess water vapor as the overhead from distillation column 22 via line 67. The upper region of said column from which the overhead is obtained operates under a temperature of from between about 170° F. to 210° F., preferably about 190° F. to 195° F. and a pressure between about 15 and 30 psia, preferably about 22 to 26 psia. The temperature and pressure of fourth pressure region 29 must be less than the temperature and pressure selected for the upper region of distillation column 22.

The fourth pressure region also receives an overhead from anhydrous distillation columns 47 which typically includes an anhydrous column and a benzene tower. A reflux obtained from the fourth pressure region is sent through line 46 to the anhydrous distillation columns.

The overhead obtained from pressure region 29 comprised of low pressure water vapor proceeds via line 35 to 36. A portion of the water vapor is sent to heat exchanger 19 through line 37 to heat the solution obtained from separation zone 15 prior to entry into distillation column 22. The remainder is sent to recompression zone 38. It should be understood that the return of the water vapor to the recompression zone can be taken from any of the pressure regions of the evaporator. It is, however, preferred to obtain the water vapor from one of the lower pressure regions.

At recompression zone 38 the excess water vapor generated by the supplemental evaporative heat obtained from the overhead of fourth pressure region 29 is compressed by back pressure steam turbine 39 or some other conventional power source. The water vapor is compressed to a pressure exceeding the pressure of the lower region of distillation column 22. Generally, a pressure of between about 20 and 65 psia, preferably about 25 to 35 psia, is employed.

The compressed water vapor receives additional water vapor from line 58 prior to diversion to other parts of the system which require heat. More specifically, a major portion of the compressed water vapor stream proceeds through line 59 to line 60 and 61. Part of this stream is sent to highest pressure region 26 to supply supplemental heat for operation of the evaporator. Another part of the stream is sent to the lower region of distillation column 22 to aid in effecting distillation of the solution contained therein. A minor amount of the compressed water vapor stream flows through line 59 to provide steam heat for anhydrous distillation zone 47. Part of the turbine steam can be diverted via line 68 to anhydrous column 47 to assist in further distillation operations.

A high concentration alcohol stream 67 is condensed in fourth pressure region 29 and proceeds through line 62 to reflux drum 63. The alcohol stream recovered is divided at pump 64 into two alcohol streams each having a concentration of about 95 vol %. Part of the alcohol stream is sent to distillation column 22 via line 66 while the remainder is forwarded to anhydrous distillation columns 47 via line 65 to obtain substantially pure alcohol having a concentration of at least 99.5% which is collected in storage area 69. Excess water and condensate is removed from the system via line 70. Further, an overhead from the anhydrous distillation columns is recycled to fourth pressure region 29 via line 57.

Water vapor as an overhead and condensate exit from lowest pressure region 30 via lines 40 and 41 and are collected in drum 42. Condensate is removed therefrom through line 45 to combine with condensate from heat exchanger 19 flowing through line 21. Exhaust gases are removed from the system via line 43 and vacuum pump 44.

The bottom of lowest pressure region 30 is a solution comprised of soluble solid organic matter such as proteins and fats which is forwarded through line 48 to combine with the soluble solid solution obtained from separation zone 15 via conveyer 50 and line 49. The combined solution is then fed to drying zone 51.

In the FIGURE, the drying zone is represented by a steam tube dryer containing multiple drying elements. Alternatively, a series of dryers may be used. Of particular importance is that the dryer must operate under pressure to achieve the objects of the invention. Dryer 51 containing multiple drying elements is heated by steam under a pressure in the range of 135–180 psia, preferably about 165 psia from the back pressure extraction turbine 39 via line 56.

Dryer 51 must be operated under pressure exceeding the pressure utilized in the lower region of distillation column 22. Typically, the pressure employed is between 15 and 70 psia and, preferably, between 25 and 55 psia.

The vapor recovered in dryer 51 proceeds via line 52 to the lower region of distillation column 22. In a preferred form of the invention part of the recovered vapor is diverted through line 53 to provide heat to anhydrous distillation columns 47. The heat provided to the distillation section of the system can be in the form of live steam or reboil steam. Distillers Dried Grain is obtained as an end product from dryer 51 and sent via line 54 to collection area 55.

The effect of the present process is to reduce the overall energy required to produce a U.S. gallon of alcohol to less than 35,000 LVU fuel equivalent B.t.u.'s. This results in a reduction of at least 40% of the energy used in prior art processes which typically require 60,000 Btu/gallon of alcohol.

The savings in energy is a result of the present process which advantageously (1) recovers about 4.5 Btu of recoverable steam for each Btu of compression energy expended, (2) makes steam production for the system more thermodynamically efficient by utilizing a steam turbine let down system rather than a conventional low pressure boiler unit or steam let down system, (3) reduces cooling water requirements of the distillation section because the cooling duties are recovered during evaporation, (4) alleviates the need to operate the distillation columns at elevated pressures to integrate and recover condenser heat duties, (5) significantly reduces the consumption of steam condensate in the system by replacing live boiler stem injection with "dirty steam" recycled within the system, and (6) increases operability and service life of the first distillation column by separating the insoluble solids from the fermented feed prior to entry into the first distillation column.

While the following example is directed to the production of ethanol, it should be noted that the present invention contemplates the production of alcohols generally.

EXAMPLE

A dilute aqueous slurry containing 234,689 lb/hr water, 23,654 lb/hr of soluble and insoluble organic matter and 16,949 lb/hr ethanol obtained from the cooking and fermentation zones is fed to the separation zone. The slurry is centrifuged and pressed to produce a portion containing 222,359 lbs/hr water, 16,667 lbs/hr of primarily soluble organic matter and 16,058 lbs/hr of ethanol which is heated to a temperature of 150° prior to entry into the first distillation column or beer still. The column is operated at a temperature of 252° F. and a pressure of 30 psia.

A bottom is obtained from the column in the form of a solution containing soluble organic matter. Part of the bottom is returned to the cooking and fermentation zones. The remainder composed of 205,144 lb/hr of water and 12,473 lb/hr of the soluble organic matter is sent to the highest pressure region of a five region multieffect evaporator. This region operates at a temperature of 232° F. and a pressure of 20 psia. Water vapor and condensate are sent to the next pressure region in the series operating at a temperature of 214° F. and a pressure of 15 psia. This procedure continues for the remaining pressurized regions.

The third pressure region operating at a temperature of 190° F. and a pressure of 9.4 psia provides water vapor and condensate to a two stage fourth pressure region operating at a temperature of 170° F. and a pressure of 6 psia. This region receives the excess water vapor as the overhead from the first distillation column, the upper region of which operates at a temperature of 190° F. and a pressure of 24 psia. Excess low pressure water vapor is removed from the fourth pressure at the rate of 62,664 lbs/hr and 47,055 lbs/hr are sent to the vapor recompressor where it is compressed to a pressure of 33 psia. The pressurized water vapor combines with quench water from the system. 1410 lbs/hr of the pressurized water vapor is sent to the anhydrous distillation columns. The remainder is sent to the highest pressure region of the evaporator (12,549 lbs/hr) and to the lower region of the first distillation column (41,435 lbs/hr). 15,609 lbs/hr of the low pressure water vapor is sent to a heat exchanger and used to heat the feed solution prior to entry into the first distillation column.

An ethanol stream is removed from the fourth pressure region and sent to a reflux drum. Most of resulting stream having a concentration of 95% ethanol (16,709 lbs/hr of ethanol and 1,238 lbs/hr of water) is sent to the anhydrous distillation columns for further purification. The remainder is sent back as a reflux to the first distillation column.

The lowest pressure region of the evaporation zone having a temperature of 120° F. and a pressure of 1.7 psia eliminates water vapor as an overhead and condensate at the rate of 136,319 lbs/hr. The bottom of this region containing water (18,710 lbs/hr) and soluble solids (12,473 lbs/hr) is combined with the insoluble fraction obtained from the separation zone. The insoluble fraction consists of 12,330 lbs/hr of water 6,986 lbs/hr of insolubles and 891 lbs/hr of ethanol.

The combined stream enters a steam tube dryer which is heated by steam under a pressure of 165 psia obtained from a back pressure steam turbine at the rate of 37,111 lbs/hr. The dryer is operated under a pressure of 33 psia. Distillers Dried Grain containing 2,162 lbs/hr of water, 19,459 lbs/hr of solid organic matter and 56 lbs/hr of ethanol is recovered therefrom.

Pressurized vapor containing 28,876 lbs/hr of water and 835 lbs/hr of ethanol is removed from the dryer under a pressure of 33 psia. This stream is sent to the lower region of the first distillation column. If commercially desirable a portion of the stream may be diverted to the anhydrous distillation columns.

The aforementioned process conditions result in an ethanol product obtained from the anhydrous distillation columns composed 16,525 lbs/hr of ethanol and 83 lbs/hr of water. Drain water and condensate is also obtained as a bottom from the anhydrous distillation columns at the rate of 1155 lbs/hr.

What we claim is:

1. In a distillation method for the production of anhydrous alcohol from a fermented feed wherein the fermented feed is distilled in a first distillation column to obtain an alcohol portion as an overhead, introducing said alcohol portion to at least one additional distillation column, removing as a bottom from said first distillation column a lean mash primarily containing dissolved organic matter, separating said lean mash into a first spent feed and a second spent feed, introducing said first spent feed as a sidestream into an evaporation zone having at least two successively decreasing pressure regions, and removing a concentrated first spent feed from a lower pressure region of said evaporation zone, the improvement comprising:

(a) separating said fermented feed into a first fermented feed containing dissolved organic matter and a second fermented feed containing insoluble organic matter;

(b) introducing said first fermented feed as a sidestream into said first distillation column and said second fermented feed into a drying zone;

(c) drying said second fermented feed in said drying zone at a pressure greater than the pressure of a lower region of said distillation column;

(d) removing a pressurized vapor stream from said drying zone; and (e) introducing said pressurized vapor stream as a sidestream into the lower region of said first distillation column.

2. The process of claim 1 further comprising introducing said concentrated first spent feed into said drying zone.

3. The process of claim 2 wherein said concentrated first spent feed is combined with said second fermented feed to thereby form a combined feed, introducing said combined feed into said drying zone and drying said combined feed to thereby obtain Distillers Dried Grain.

4. The process of claim 1 wherein said second spent feed is returned to a fermenting region.

5. The process of claims 1 or 2 wherein said drying zone has a pressure between about 15 and 70 psia.

6. The process of claim 5 wherein said pressure is between about 35 and 55 psia.

7. The process of claims 1 or 2 wherein said drying zone comprises a steam tube dryer having at least two drying tubes and is heated by steam under pressure in the range of between about 135 and 180 psia.

8. The process of claims 1 or 2 further comprising diverting a part of said pressurized vapor stream to said additional distillation columns.

9. The process of claims 1 or 2 further comprising removing water vapor as an overhead from one of said pressure regions of said evaporation zone, compressing said water vapor, introducing a first portion of said compressed water vapor to the highest pressure region of said evaporation zone, a second portion to said first distillation column and a third portion to said additional distillation columns.

10. The process of claim 9 wherein the highest pressure region of said evaporation zone has a pressure of between about 15 and 45 psia and a temperature of between about 212° and 275° F. and the lowest pressure region has a pressure of between about 1.0 and 20 psia and a temperature of between about 100° and 230° F.

11. The process of claim 9 wherein the water vapor removed from one of said pressure regions is compressed to a pressure greater than the pressure of the lower region of said first distillation column.

* * * * *